(12) United States Patent
Kin et al.

(10) Patent No.: US 11,095,149 B2
(45) Date of Patent: Aug. 17, 2021

(54) UNINTERRUPTIBLE POWER SUPPLY

(71) Applicant: FUJI ELECTRIC CO., LTD., Kawasaki (JP)

(72) Inventors: Seiitsu Kin, Hachioji (JP); Daisuke Kawasaki, Kakogawa (JP); Yoshihiko Yamagata, Kobe (JP); Hiroki Muratsu, Kobe (JP); Tomo Kurozaki, Kobe (JP); Yosuke Iwamaru, Kobe (JP); Keita Koshii, Kobe (JP)

(73) Assignee: FUJI ELECTRIC CO., LTD., Kawasaki (JP)

(*) Notice: Subject to any disclaimer, the term of this patent is extended or adjusted under 35 U.S.C. 154(b) by 0 days.

(21) Appl. No.: 16/073,581

(22) PCT Filed: Jul. 4, 2017

(86) PCT No.: PCT/JP2017/024500
§ 371 (c)(1),
(2) Date: Jul. 27, 2018

(87) PCT Pub. No.: WO2018/030034
PCT Pub. Date: Feb. 15, 2018

(65) Prior Publication Data
US 2019/0190312 A1    Jun. 20, 2019

(30) Foreign Application Priority Data
Aug. 10, 2016  (JP) .............................. JP2016-158142

(51) Int. Cl.
*H02J 7/00*       (2006.01)
*H02J 9/00*       (2006.01)
(Continued)

(52) U.S. Cl.
CPC ................ *H02J 9/062* (2013.01); *H02J 3/38* (2013.01); *H02M 5/42* (2013.01); *H02M 7/003* (2013.01); *H02J 9/068* (2020.01)

(58) Field of Classification Search
CPC ...... H02J 9/062; H02J 3/38; H02J 9/06; H02J 2009/068; H02M 7/48; H02M 7/003; H02M 5/42; H05K 5/0021; H05K 5/00
See application file for complete search history.

(56) References Cited

U.S. PATENT DOCUMENTS 5,521,511 A *  5/1996  Lanzi ................. G01R 31/2853
                                                     324/522
2012/0009461 A1 * 1/2012 Kim .................... H01M 2/1077
                                                     429/158
(Continued)

FOREIGN PATENT DOCUMENTS

JP       2002-044956 A    2/2002
JP       2010-148196 A    7/2010
(Continued)

OTHER PUBLICATIONS

PCT/ISA/210, "International Search Report for International Application No. PCT/JP2017/024500," dated Sep. 26, 2017.
(Continued)

*Primary Examiner* — Hal Kaplan
*Assistant Examiner* — Rasem Mourad
(74) *Attorney, Agent, or Firm* — Manabu Kanesaka

(57) ABSTRACT

In an uninterruptible power supply, first connection members that connect input side-switches of a plurality of uninterruptible power supply modules to each other and that connect output-side switches of the plurality of uninterruptible power supply modules to each other, and second connection members connected in parallel to the first connection
(Continued)

members are disposed at positions accessible from a front side of the uninterruptible power supply modules.

13 Claims, 5 Drawing Sheets

(51) Int. Cl.
    *H02J 9/06*     (2006.01)
    *H02M 7/00*     (2006.01)
    *H02J 3/38*     (2006.01)
    *H02M 5/42*     (2006.01)

(56) References Cited

U.S. PATENT DOCUMENTS

2014/0210271 A1* 7/2014 Toyoda ............... H02J 3/46
    307/66
2015/0380885 A1* 12/2015 Wildstone ............... H01R 4/60
    307/64
2017/0077747 A1* 3/2017 Paatero ................ H02J 9/061

FOREIGN PATENT DOCUMENTS

JP     2010148196 A * 7/2010
JP     5732134 B2     6/2015

OTHER PUBLICATIONS

PCT/ISA/237, "Written Opinion of the International Searching Authority for International Application No. PCT/JP2017/024500," dated Sep. 26, 2017.

* cited by examiner

UNINTERRUPTIBLE POWER SUPPLY

CROSS-REFERENCE TO RELATED APPLICATION

This application is a continuation of PCT application PCT/JP2017/024500, filed on Jul. 4, 2017, which is based upon and claims priority of Japanese patent application No. 2016-158142, filed on Aug. 10, 2016, the entire contents of which are incorporated herein by reference.

BACKGROUND OF THE INVENTION

Field of the Invention

The present invention relates to an uninterruptible power supply, and more particularly, it relates to an uninterruptible power supply including a plurality of uninterruptible power supply modules.

Description of the Background Art

An uninterruptible power supply including a plurality of uninterruptible power supply modules is known in general. Such a power supply unit is disclosed in Japanese Patent No. 5732134.

Japanese Patent No. 5732134 discloses an uninterruptible power supply including a plurality of uninterruptible power supply modules connected in parallel to a load. This uninterruptible power supply includes wiring (hereinafter referred to as input-side connection wiring) that connects the input sides of the plurality of uninterruptible power supply modules to each other and wiring (hereinafter referred to as output-side connection wiring) that connects the output sides of the plurality of uninterruptible power supply modules to each other.

In the conventional uninterruptible power supply as described in Japanese Patent No. 5732134, after the plurality of uninterruptible power supply modules is disposed, the input sides of the plurality of uninterruptible power supply modules are connected to each other by the input-side connection wiring, and the output sides of the plurality of uninterruptible power supply modules are connected to each other by the output-side connection wiring. Furthermore, in the conventional uninterruptible power supply as described in Japanese Patent No. 5732134, the input-side connection wiring and the output-side connection wiring may be provided on the back side of the uninterruptible power supply modules (housings that house the uninterruptible power supply modules).

However, in the conventional uninterruptible power supply in which the input-side connection wiring and the output-side connection wiring are provided on the back side of the uninterruptible power supply modules (the housings that house the uninterruptible power supply modules), a work area for attaching the input-side connection wiring and the output-side connection wiring (connection member) is required between the uninterruptible power supply modules and the wall surface when the uninterruptible power supply modules are disposed in the vicinity of the wall surface. That is, a work area required to install the uninterruptible power supply disadvantageously becomes large.

SUMMARY OF THE INVENTION

The present invention has been proposed in order to solve the aforementioned problem, and an object of the present invention is to provide an uninterruptible power supply capable of significantly reducing or preventing an increase in the size of a work area required for installation.

An uninterruptible power supply according to an aspect of the present invention includes a plurality of uninterruptible power supply modules including input-side switches into which AC power is input from an AC power source, power converters connected to the input-side switches, and output-side switches that output AC power received from the power converters, a first connection member that connects the input side-switches of the plurality of uninterruptible power supply modules to each other and a first connection member that connects the output-side switches of the plurality of uninterruptible power supply modules to each other, and second connection members connected in parallel to the first connection members. The first connection members and the second connection members are disposed at positions accessible from a front side of the uninterruptible power supply modules.

In the uninterruptible power supply according to this aspect of the present invention, as described above, the connection member that connects the input-side switches of the plurality of uninterruptible power supply modules to each other and the connection member that connects the output-side switches of the plurality of uninterruptible power supply modules to each other are disposed at the positions accessible from the front side of housings. Thus, the connection members are disposed at the positions accessible from the front side of the housings, and hence even when the uninterruptible power supply modules are disposed in the vicinity of the wall surface, it is not necessary to provide a work area for attaching the connection members between the uninterruptible power supply modules and the wall surface. Consequently, it is possible to significantly reduce or prevent an increase in the size of a work area required to install the uninterruptible power supply. Furthermore, the uninterruptible power supply can be installed close to the wall, and hence a space on the front side of the uninterruptible power supply can be effectively utilized.

In addition, unlike the case where the connection members are provided on the back side of the uninterruptible power supply modules, and the connection members are attached in a relatively small work area between the uninterruptible power supply modules and the wall surface, the workability of attaching the connection members can be improved. Furthermore, even when the amount of current that flows through the connection members increases, the current capacity of the connection members can be easily increased simply by providing the second connection members in parallel to the first connection members. When the amount of current that flows through the connection members is relatively small, the connection members are configured to include only the first connection members such that it is possible to significantly reduce or prevent an increase in the size of the connection members.

In the aforementioned uninterruptible power supply according to this aspect, the second connection members each preferably have a current capacity proportional to a number of the uninterruptible power supply modules.

In the aforementioned uninterruptible power supply according to this aspect, the second connection members in the uninterruptible power supply modules connected closer to the AC power source preferably have larger current capacities.

In the aforementioned uninterruptible power supply according to this aspect, the first connection members preferably include an input-side connection member that connects the input-side switches to each other, and an output-side connection member that connects the output-side switches to each other, and the input-side connection member and the output-side connection member are preferably disposed in any of upper portions of the uninterruptible power supply modules, lower portions of the uninterruptible power supply modules, and middle portions of the uninterruptible power supply modules. According to this configuration, the input-side connection member and the output-side connection member are disposed above, below, or between the devices that the uninterruptible power supply modules include, such that the input-side connection member and the output-side connection member can be easily exposed on the front side of the housings.

In this case, the power converters are preferably disposed in the lower portions of the uninterruptible power supply modules, the input-side switches and the output-side switches are preferably disposed above the power converters, and the input-side connection member and the output-side connection member are preferably disposed in the upper portions of the uninterruptible power supply modules. According to this configuration, unlike the case where the input-side connection member and the output-side connection member are disposed in the lower portions (in the vicinity of the ground) of the uninterruptible power supply modules, a worker can attach the input-side connection member and the output-side connection member without losing his or her balance. Consequently, the workability of attaching the input-side connection member and the output-side connection member can be improved.

In the aforementioned uninterruptible power supply according to this aspect, the plurality of uninterruptible power supply modules preferably includes a first uninterruptible power supply module, a second uninterruptible power supply module, and a third uninterruptible power supply module disposed in order from the AC power supply side, each of connection members respectively connected to the input-side switches and the output-side switches of the third uninterruptible power supply module preferably includes the first connection member, each of connection members respectively connected to the input-side switches and the output-side switches of the second uninterruptible power supply module preferably includes the first connection member and a second connection member, and each of connection members respectively connected to the input-side switches and the output-side switches of the first uninterruptible power supply module preferably includes the first connection member and a plurality of the second connection members. When the input-side switches of the first uninterruptible power supply module, the second uninterruptible power supply module, and the third uninterruptible power supply module are connected to each other by the connection member, and the output-side switches of the first uninterruptible power supply module, the second uninterruptible power supply module, and the third uninterruptible power supply module are connected to each other by the connection member, current that flows to the input-side switches of the uninterruptible power supply module(s) disposed downstream of current flow as well as current that flows to its own input-side switches flows through the connection member connected to the input-side switches of the uninterruptible power supply module(s) disposed upstream of the current flow. Similarly, current that flows from the output-side switches of the uninterruptible power supply module(s) disposed upstream of current flow as well as current that flows from its own output-side switches flows through the connection member connected to the output-side switches of the uninterruptible power supply module(s) disposed downstream of the current flow. Therefore, with the above configuration, the current capacity of the connection member disposed upstream of input power (downstream of output power) is larger than the current capacity of the connection member disposed downstream of input power (upstream of output power), and hence it is possible to significantly reduce or prevent flow of current that exceeds the current capacity.

The aforementioned uninterruptible power supply according to this aspect preferably further includes fastener members that fasten the input-side switches and the output-side switches to the first connection members, and the second connection members each preferably have a bent shape so as to avoid the fastener members. According to this configuration, the fastener members are allowed to escape due to the bent shape of the second connection members, and hence mechanical interference between the fastener members and the second connection members can be prevented.

The aforementioned uninterruptible power supply according to this aspect preferably further includes fastener members that fasten the input-side switches and the output-side switches to the first connection members, and the second connection members each preferably include at least one of holes and notches through which the fastener members pass. According to this configuration, the fastener members are allowed to escape due to the holes or the notches, and hence mechanical interference between the fastener members and the second connection members can be prevented. Furthermore, the fastener members pass through at least one of the holes and the notches such that the second connection members can be disposed so as to overlap the first connection members without being bent. Thus, it is possible to significantly reduce or prevent an increase in the size of the connection members.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are hereinafter described with reference to the drawings.

First Embodiment (Circuit Configuration)

First, the circuit configuration of an uninterruptible power supply 100 according to a first embodiment is described with reference to FIG. 1.

Figure 1:
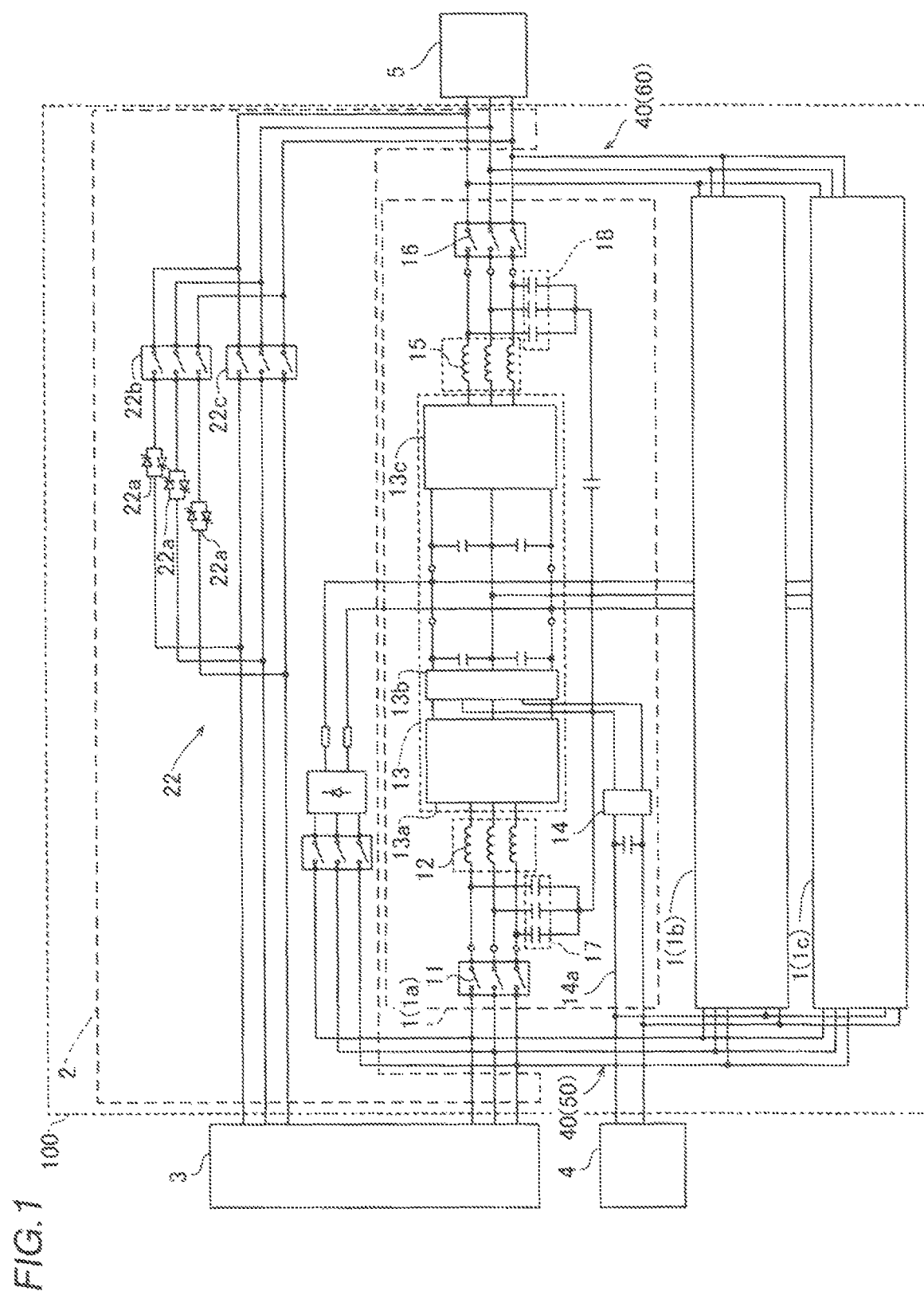
FIG. 1 is a circuit configuration diagram of an uninterruptible power supply according to a first embodiment of the present invention.
Figure 2:
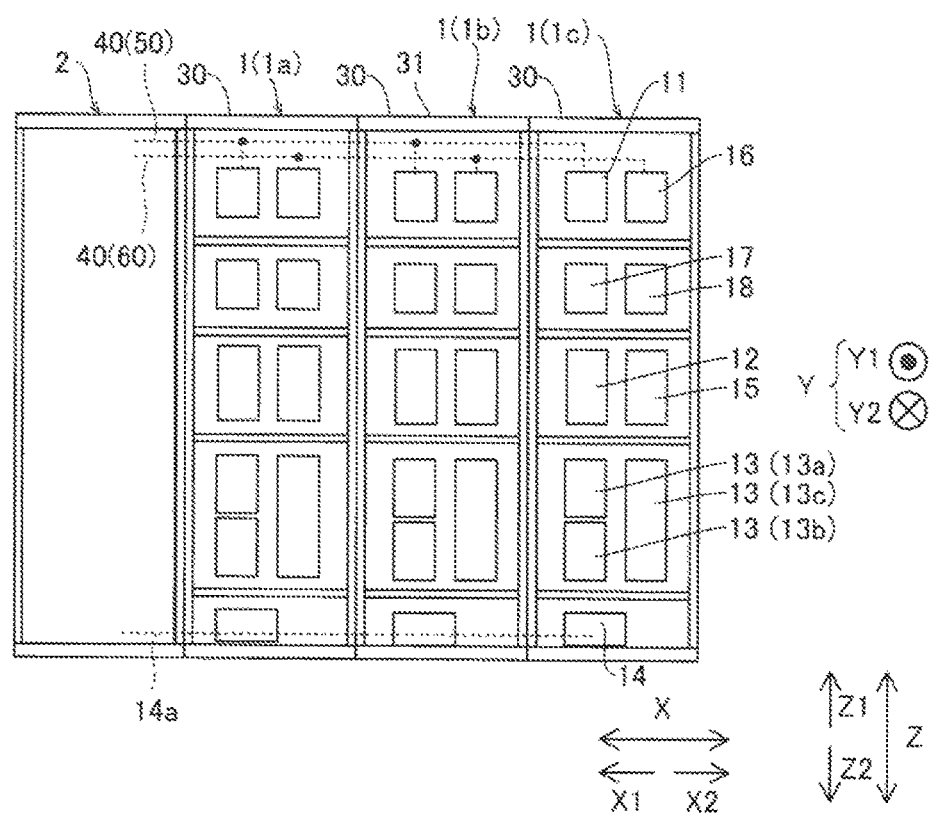
FIG. 2 is a front view schematically showing the uninterruptible power supply according to the first embodiment of the present invention.

As shown in FIG. 1, the uninterruptible power supply 100 includes a plurality of uninterruptible power supply modules 1 (a first uninterruptible power supply module 1a, a second uninterruptible power supply module 1b, and a third uninterruptible power supply module 1c) and an input/output module 2 (I/O module). The plurality of uninterruptible power supply modules 1 is disposed in parallel to each other. As shown in FIG. 2, the plurality of uninterruptible power supply modules 1 (the first uninterruptible power supply module 1a, the second uninterruptible power supply module 1b, and the third uninterruptible power supply module 1c) is disposed adjacent to each other in a right-left direction. Furthermore, the input/output module 2 is disposed adjacent to the uninterruptible power supply modules 1 in the right-left direction (direction X). For example, in FIG. 2, the input/output module 2 is disposed on the left side (arrow X1 direction side) of the plurality of uninterruptible power supply modules 1. In the uninterruptible power supply 100, the plurality of uninterruptible power supply modules 1 and the input/output module 2 are connected to each other via connection members 40 (an input-side connection member 50 and an output-side connection member 60) described later.

As shown in FIG. 1, an uninterruptible power supply module 1 includes input-side switches 11. The input-side switches 11 receive AC power from an AC power source 3. An input-side switch 11 is provided for each phase (U-phase, V-phase, and W-phase), and a total of three input-side switches 11 are provided in the uninterruptible power supply module 1.

The uninterruptible power supply module 1 includes input filters 12. The input filters 12 are connected to the input-side switches 11. An input filter 12 is provided for each phase, and a total of three input filters 12 are provided in the uninterruptible power supply module 1.

The uninterruptible power supply module 1 includes a power converter 13. The power converter 13 is connected to the input-side switches 11 via the input filters 12. The power converter 13 includes a rectifier circuit 13a, a chopper circuit 13b, and an inverter circuit 13c. In addition, the power converter 13 includes elements made of silicon carbide (SiC). Thus, as compared with the case where the power converter 13 includes elements made of silicon, the power loss of the power converter 13 is reduced, and the amount of heat generation due to the power loss is reduced.

The rectifier circuit 13a has a function of converting the AC power input into the power converter 13 into DC power. The chopper circuit 13b is configured as a three-level chopper circuit, for example. That is, the chopper circuit 13b has a function of transforming the voltage of the DC power obtained by conversion by the rectifier circuit 13a and outputting the voltage as three levels of voltage. The DC power, the voltage of which has been transformed by the chopper circuit 13b, is connected to a battery 4 via a DC reactor 14 and a DC bus 14a.

The uninterruptible power supply module 1 includes output filters 15. The output filters 15 are connected to the inverter circuit 13c of the power converter 13. An output filter 15 is provided for each phase, and a total of three output filters 15 are provided in the uninterruptible power supply module 1.

The uninterruptible power supply module 1 includes output-side switches 16. The output-side switches 16 output AC power received from the power converter 13 via the output filters 15. An output-side switch 16 is provided for each phase, and a total of three output-side switches 16 are provided in the uninterruptible power supply module 1.

The uninterruptible power supply module 1 includes input-side filter capacitors 17 provided between the input-side switches 11 and the input filters 12. The uninterruptible power supply module 1 further includes output-side filter capacitors 18 provided between the output-side switches 16 and the output filters 15.

The input-side switches 11, the input filters 12, the power converter 13, the output filters 15, the output-side switches 16, the input-side filter capacitors 17, and the output-side filter capacitors 18 are included in each of the plurality of uninterruptible power supply modules 1.

The uninterruptible power supply 100 includes a direct transmission circuit 22. The direct transmission circuit 22 is provided in the input/output module 2, and is connected to the AC power source 3 and the output sides (load 5 sides) of the plurality of uninterruptible power supply modules 1. The direct transmission circuit 22 includes thyristor switches 22a and mechanical switches 22b connected in series to the thyristor switches 22a. The direct transmission circuit 22 includes mechanical switches 22c connected in parallel to the thyristor switches 22a and the mechanical switches 22b connected in series to each other.

(Configuration Relating to Arrangement of Devices)

Next, the configuration relating to the arrangement of devices inside housings 30 of the uninterruptible power supply modules 1 is described with reference to FIG. 2.

As shown in FIG. 2, the uninterruptible power supply 100 includes a plurality of housings 30 that houses the plurality of uninterruptible power supply modules 1, respectively. The housings 30 each have a box shape. The input-side switches 11, the input filters 12, the power converter 13, the DC reactor 14, the output filters 15, the output-side switches 16, the input-side filter capacitors 17, and the output-side filter capacitors 18 are housed inside each of the housings 30. Specifically, each of the housings 30 houses the input-side switches 11, the input-side filter capacitors 17, the input filters 12, the power converter 13 (the rectifier circuit 13a and the chopper circuit 13b) in this order from the upper side (upper surface 31) toward the lower side (in an arrow Z2 direction). Furthermore, each of the housings 30 houses the power converter 13 (inverter circuit 13c), the output filters 15, the output-side filter capacitors 18, and the output-side switches 16 in this order in an upward direction (arrow Z1 direction).

According to the first embodiment, the uninterruptible power supply 100 includes a connection member 40 that connects the input-side switches 11 of the plurality of uninterruptible power supply modules 1 to each other and a connection member 40 that connects the output-side switches 16 of the plurality of uninterruptible power supply modules 1 to each other. The connection members 40 are disposed at positions accessible from the front side (arrow Y1 direction side) of the housings 30. The positions accessible from the front side of the housings 30 denote positions in an area corresponding to the length of the arm of a general worker from the front ends of the housings 30 toward the inside of the housings 30. That is, a user (worker) can attach and maintain the connection members 40 from the front side of the housings 30. The "front side" denotes the side opposite to the wall side (back side) of the uninterruptible power supply 100 when the uninterruptible power supply 100 is disposed on the wall or the like. The connection members 40 are each made of a member having conductivity such as copper.

The housings 30 include openable and closable front doors (not shown) so as to expose the front side (arrow Y1 direction side). The connection members 40 are disposed at the positions accessible from the front side of the housings 30 in a state where the front doors are opened.

According to the first embodiment, the connection members 40 include the input-side connection member 50 that connects the input-side switches 11 to each other and the output-side connection member 60 that connects the output-side switches 16 to each other. The input-side connection member 50 and the output-side connection member 60 are disposed in upper portions of the uninterruptible power supply modules 1 in the housings 30. As described above, the power converter 13 is disposed in a lower portion of each of the housings 30, and the input-side switches 11 and the output-side switches 16 are disposed above the power converter 13. Both of the input-side connection member 50 and the output-side connection member 60 are disposed in the upper portions of the uninterruptible power supply modules 1 (above the input-side switches 11 and the output-side switches 16).

Figure 3:
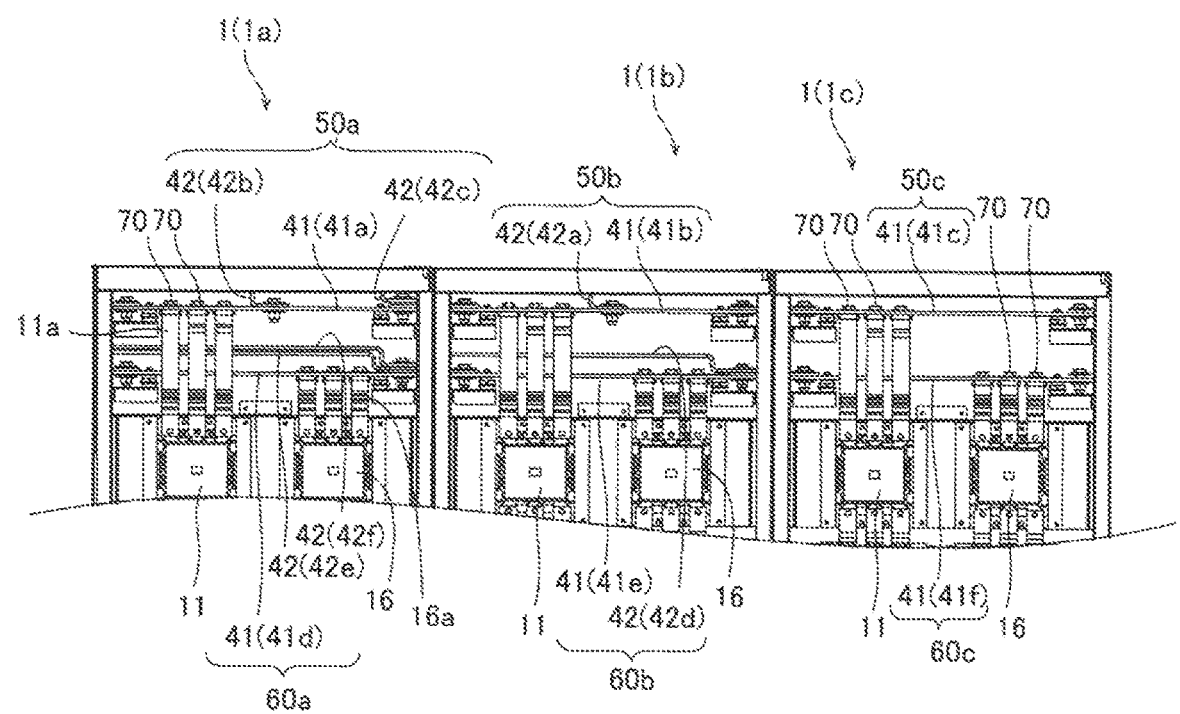
FIG. 3 is a side view of a connection member of the uninterruptible power supply according to the first embodiment of the present invention.

As shown in FIG. 3, the input-side connection member 50 is disposed above the output-side connection member 60. That is, connection terminals 11a of the input-side switches 11 extend upward beyond connection terminals 16a of the output-side switches 16. Thus, the input-side connection member 50 connected to the connection terminals 11a of the input-side switches 11 is disposed above the output-side connection member 60 connected to the connection terminals 16a of the output-side switches 16. Furthermore, the input-side connection member 50 is disposed vertically above the output-side connection member 60.

The input-side connection member 50 is connected to the inside of the input/output module 2, and transmits AC power to each of the input-side switches 11 via the input/output module 2. The output-side connection member 60 is connected to the inside of the input/output module 2, and supplies AC power from each of the output-side switches 16 to the load 5 via the input/output module 2.

Figure 4:
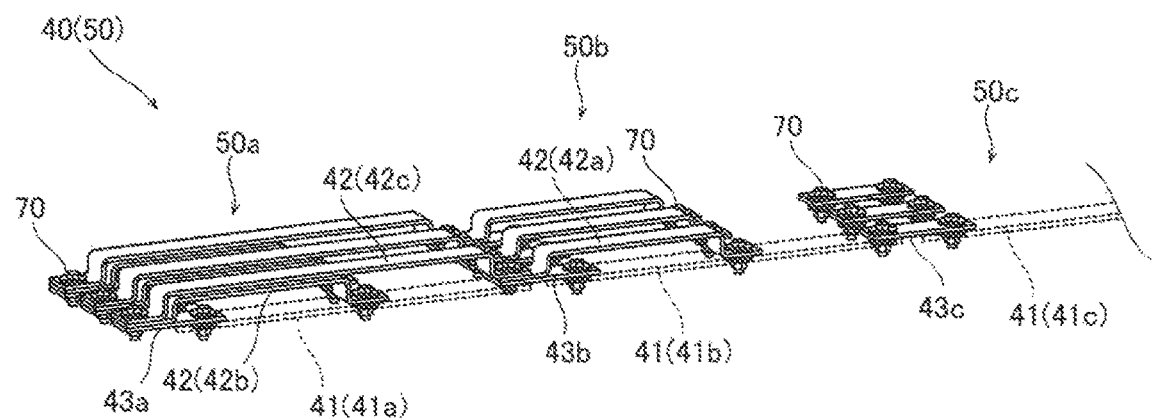
FIG. 4 is a perspective view of an input-side connection member of the uninterruptible power supply according to the first embodiment of the present invention.

According to the first embodiment, as shown in FIGS. 3 and 4, each of the connection members 40 includes at least first connection members 41 of the first connection members 41 that connect the input-side switches 11 of the plurality of uninterruptible power supply modules 1 to each other or that connect the output-side switches 16 of the plurality of uninterruptible power supply modules 1 to each other and second connection members 42 connected in parallel to the first connection members 41 and that increase the capacity of current that flows between the input-side switches 11 or the capacity of current that flows between the output-side switches 16.

Figure 5:
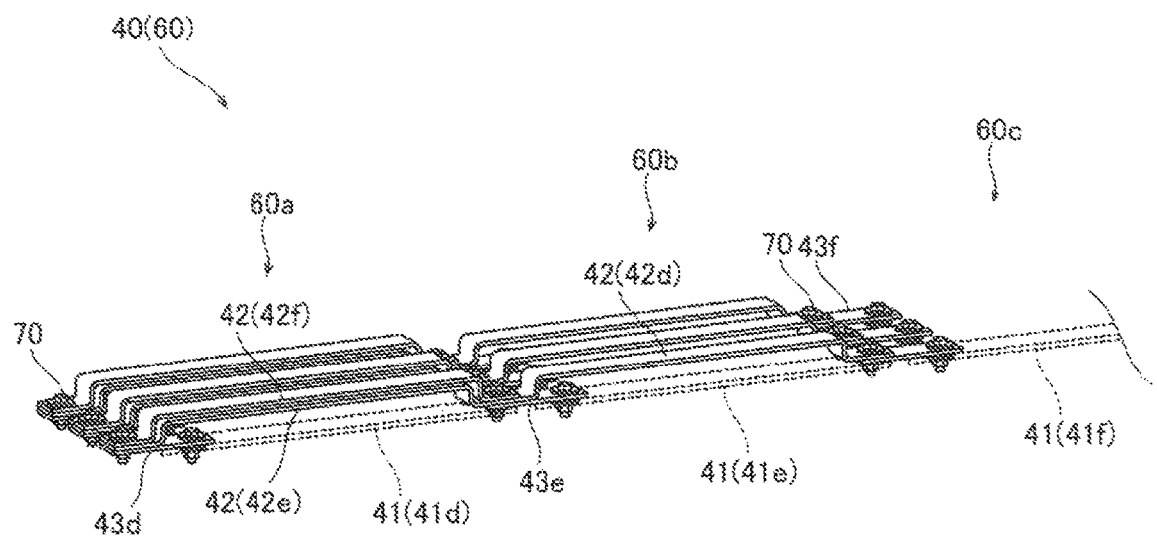
FIG. 5 is a perspective view of an output-side connection member of the uninterruptible power supply according to the first embodiment of the present invention.

Specifically, as shown in FIGS. 3 and 4, the plurality of uninterruptible power supply modules 1 includes the first uninterruptible power supply module 1a, the second uninterruptible power supply module 1b, and the third uninterruptible power supply module 1c disposed in order from the AC power source 3 (input/output module 2) side. As shown in FIGS. 4 and 5, a connection member (input-side connection member 50c) connected to the input-side switches 11 of the third uninterruptible power supply module 1c includes a first connection member 41 (first connection member 41c). Furthermore, a connection member (output-side connection member 60c) connected to the output-side switches 16 of the third uninterruptible power supply module 1c includes a first connection member 41 (first connection member 41f). That is, a second connection member 42 is not included in the input-side connection member 50c or the output-side connection member 60c of the third uninterruptible power supply module 1c.

A connection member (input-side connection member 50b) connected to the input-side switches 11 of the second uninterruptible power supply module 1b includes a first connection member 41 (first connection member 41b) and a second connection member 42 (second connection member 42a). A connection member (output-side connection member 60b) connected to the output-side switches 16 of the second uninterruptible power supply module 1b includes a first connection member 41 (first connection member 41e) and a second connection member 42 (second connection member 42d). That is, each of the input-side connection member 50b and the output-side connection member 60b of the second uninterruptible power supply module 1b includes one first connection member 41 and one second connection member 42.

A connection member (input-side connection member 50a) connected to the input-side switches 11 of the first uninterruptible power supply module 1a includes a first connection member 41 (first connection member 41a) and a plurality of second connection members 42 (second connection members 42b and 42c). A connection member (output-side connection member 60a) connected to the output-side switches 16 of the first uninterruptible power supply module 1a includes a first connection member 41 (first connection member 41d) and a plurality of second connection members 42 (second connection members 42e and 42f). Specifically, each of the input-side connection member 50a and the output-side connection member 60a of the first uninterruptible power supply module 1a includes one first connection member 41 and two second connection members 42.

The uninterruptible power supply 100 receives three-phase (U-phase, V-phase, and W-phase) AC power and outputs three-phase AC power. The uninterruptible power supply 100 includes three input-side connection members 50a, three input-side connection members 50b, three input-side connection members 50c, three output-side connection members 60a, three output-side connection members 60b, and three output-side connection members 60c (three-phase three-wire system).

According to the first embodiment, each of the input-side switches 11 and the output-side switches 16 and the first connection members 41 are fixed (fastened) by bolts 70. The second connection members 42 connected in parallel to the first connection members 41 each have a bent shape so as to avoid the bolts 70. The bolts 70 are examples of a "fastener member" in the claims.

(Detailed Structure of Input-Side Connection Member)

The detailed structure of the input-side connection member 50 connected to the input-side switches 11 is now described.

As shown in FIG. 4, the AC power source 3 side and the first connection member 41a of the first uninterruptible power supply module 1a are connected to each other by a connection plate 43a. The first connection member 41a of the first uninterruptible power supply module 1a and the first connection member 41b of the second uninterruptible power supply module 1b are connected to each other by a connection plate 43b. The first connection member 41b of the second uninterruptible power supply module 1b and the first connection member 41c of the third uninterruptible power supply module 1c are connected to each other by a connection plate 43c. The connection plates 43a, 43b, and 43c are fixed by bolts 70. The second connection member 42a is connected so as to straddle the first connection member 41b of the second uninterruptible power supply module 1b and the connection plate 43b while avoiding the bolts 70. The second connection member 42b is connected so as to straddle the first connection member 41a of the first uninterruptible power supply module 1a and the connection plate 43a while avoiding the bolts 70. The second connection member 42c is connected so as to straddle the connection plate 43a and the connection plate 43b while avoiding the bolts 70 and so as to overlap the upper side of the second connection member 42b. The second connection members 42a, 42b, and 42c each have a bent shape (substantially U-shape).

(Detailed Structure of Output-Side Connection Member)

The detailed structure of the output-side connection member 60 connected to the output-side switches 16 is now described.

As shown in FIG. 5, the load 5 side and the first connection member 41d of the first uninterruptible power supply module 1a are connected to each other by a connection plate 43d. The first connection member 41d of the first uninterruptible power supply module 1a and the first connection member 41e of the second uninterruptible power supply module 1b are connected to each other by a connection plate 43e. The first connection member 41e of the second uninterruptible power supply module 1b and the first connection member 41f of the third uninterruptible power supply module 1c are connected to each other by a connection plate 43f. The connection plates 43d, 43e, and 43f are fixed by bolts 70. The second connection member 42d is connected so as to straddle the connection plate 43e and the connection plate 43f while avoiding the bolts 70. The second connection member 42e is connected so as to straddle the connection plate 43d and the connection plate 43e while avoiding the bolts 70. The second connection member 42f is connected so as to straddle the connection plate 43d and the connection plate 43e while avoiding the bolts 70 and so as to overlap the upper side of the second connection member 42e. The second connection members 42d, 42e, and 42f each have a bent shape (substantially U-shape).

(Effects of First Embodiment)

According to the first embodiment, the following effects can be obtained.

According to the first embodiment, as described above, the connection member 40 that connects the input-side switches 11 of the plurality of uninterruptible power supply modules 1 to each other and the connection member 40 that connects the output-side switches 16 of the plurality of uninterruptible power supply modules 1 to each other are disposed at the positions accessible from the front side of the housings 30. Thus, the connection members 40 are disposed at the positions accessible from the front side of the housings 30, and hence even when the uninterruptible power supply modules 1 are disposed in the vicinity of the wall surface, it is not necessary to provide a work area for attaching the connection members 40 between the uninterruptible power supply modules 1 and the wall surface. Consequently, it is possible to significantly reduce or prevent an increase in the size of a work area required to install the uninterruptible power supply 100. Furthermore, the uninterruptible power supply 100 can be installed close to the wall, and hence a space on the front side of the uninterruptible power supply 100 can be effectively utilized.

In addition, unlike the case where the connection members 40 are provided on the back side of the uninterruptible power supply modules 1, and the connection members 40 are attached in a relatively small work area between the uninterruptible power supply modules 1 and the wall surface, the workability of attaching the connection members 40 can be improved.

According to the first embodiment, as described above, the power converter 13 is disposed in the lower portion of each of the housings 30, the input-side switches 11 and the output-side switches 16 are disposed above the power converter 13, and the input-side connection member 50 and the output-side connection member 60 are disposed in the upper portions of the uninterruptible power supply modules 1. Thus, the input-side connection member 50 and the output-side connection member 60 are disposed above the devices that the uninterruptible power supply modules 1 include such that the input-side connection member 50 and the output-side connection member 60 can be easily exposed on the front side of the housings 30. Furthermore, unlike the case where the input-side connection member 50 and the output-side connection member 60 are disposed in lower portions (in the vicinity of the ground) of the uninterruptible power supply modules 1, the worker can attach the input-side connection member 50 and the output-side connection member 60 without losing his or her balance. Consequently, the workability of attaching the input-side connection member 50 and the output-side connection member 60 can be improved.

According to the first embodiment, as described above, each of the connection members 40 includes at least the first connection members 41 of the first connection members 41 that connect the input-side switches 11 of the plurality of uninterruptible power supply modules 1 to each other or that connect the output-side switches 16 of the plurality of uninterruptible power supply modules 1 to each other and the second connection members 42 connected in parallel to the first connection members 41 and that increase the capacity of current that flows between the input-side switches 11 or the current capacity of current that flows between the output-side switches 16. Thus, even when the amount of current that flows through the connection members 40 increases, the current capacity of the connection members 40 can be easily increased simply by providing the second connection members 42 in parallel to the first connection members 41. In addition, when the amount of current that flows through the connection members 40 is relatively small, the connection members 40 are configured to include only the first connection members 41 such that it is possible to significantly reduce or prevent an increase in the size of the connection members 40.

According to the first embodiment, as described above, the connection members (the input-side connection member 50c and the output-side connection member 60c) of the third uninterruptible power supply module 1c respectively connected to the input-side switches 11 and the output-side switches 16 include the first connection members 41, the connection members (the input-side connection member 50b and the output-side connection member 60b) of the second uninterruptible power supply module 1b respectively connected to the input-side switches 11 and the output-side switches 16 include the first connection members 41 and the second connection members 42, and the connection members (the input-side connection member 50a and the output-side connection member 60a) of the first uninterruptible power supply module 1a respectively connected to the input-side switches 11 and the output-side switches 16 include the first connection members 41 and the second connection members 42. When the input-side switches 11 of the first uninterruptible power supply module 1a, the second uninterruptible power supply module 1b, and the third uninterruptible power supply module 1c are connected to each other by the connection member 40, and the output-side switches 16 of the first uninterruptible power supply module 1a, the second uninterruptible power supply module 1b, and the third uninterruptible power supply module 1c are connected to each other by the connection member 40, the current that flows to the input-side switches 11 of the uninterruptible power supply module(s) 1 disposed downstream of current flow as well as the current that flows to its own input-side switches 11 flows through the connection member connected to the input-side switches 11 of the uninterruptible power supply module(s) 1 disposed upstream of the current flow. Similarly, the current that flows from the output-side switches 16 of the uninterruptible power supply module(s) 1 disposed upstream of current flow as well as the current that flows from its own output-side switches 16 flows through the connection member connected to the output-side switches 16 of the uninterruptible power supply module(s) 1 disposed downstream of the current flow. Therefore, with the above configuration, the current capacity of the connection member disposed upstream of input power (downstream of output power) is larger than the current capacity of the connection member disposed downstream of input power (upstream of output power), and hence it is possible to significantly reduce or prevent flow of current that exceeds the current capacity.

According to the first embodiment, as described above, the uninterruptible power supply 100 includes the bolts 70 that fasten the input-side switches 11 and the output-side switches 16 to the first connection members 41. Furthermore, the second connection members 42 connected in parallel to the first connection members 41 each have a bent shape so as to avoid the bolts 70. Thus, the bolts 70 are allowed to escape due to the bent shape of the second connection members 42, and hence mechanical interference between the bolts 70 and the second connection members 42 can be prevented.

Second Embodiment

The configuration of an uninterruptible power supply 110 according to a second embodiment is now described with reference to FIGS. 6 and 7. In the uninterruptible power supply 110 according to the second embodiment, at least one of holes 144 and notches 145 are provided in connection members 140.

(Detailed Structure of Input-Side Connection Member)

First, the detailed structure of a connection member 140 (input-side connection member 150) connected to input-side switches 11 is described.

Figure 6:
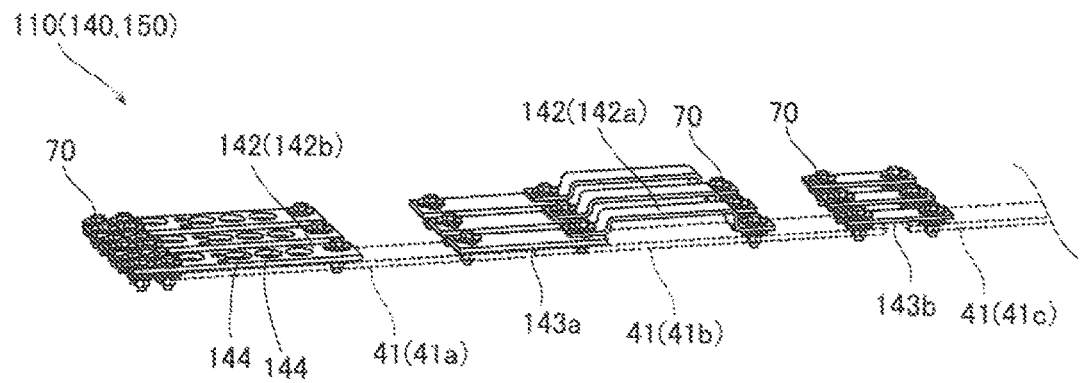
FIG. 6 is a perspective view of an input-side connection member of an uninterruptible power supply according to a second embodiment of the present invention.

As shown in FIG. 6, a connection plate 143a connects a first connection member 41a of a first uninterruptible power supply module 1a to a first connection member 41b of a second uninterruptible power supply module 1b. A connection plate 143b connects the first connection member 41b of the second uninterruptible power supply module 1b to a first connection member 41c of a third uninterruptible power supply module 1c. A second connection member 142 (142a) connects the first connection member 41b of the second uninterruptible power supply module 1b to the connection plate 143a. The second connection member 142a is provided in parallel to the first connection member 41b of the second uninterruptible power supply module 1b, and has a bent shape (substantially U-shape).

A second connection member 142 (142b) is provided in parallel to the first connection member 41a so as to overlap the first connection member 41a above the first connection member 41a of the first uninterruptible power supply module 1a. According to the second embodiment, the second connection member 142b connected in parallel to the first connection member 41a includes the holes 144 through which bolts 70 (bolts 70 that connect the input-side switches 11 to the first connection member 41a) pass. A plurality of holes 144 is provided in one second connection member 142b so as to correspond to the number of bolts 70. Furthermore, the second connection member 142b has a flat plate shape (rectangular plate shape). That is, the bolts 70 are penetrated (are allowed to escape) due to the holes 144, and hence it is not necessary to bend the second connection member 142b unlike the first embodiment.

(Detailed Structure of Output-Side Connection Member)

Next, the detailed structure of a connection member 140 (output-side connection member 160) connected to output-side switches 16 is described.

Figure 7:
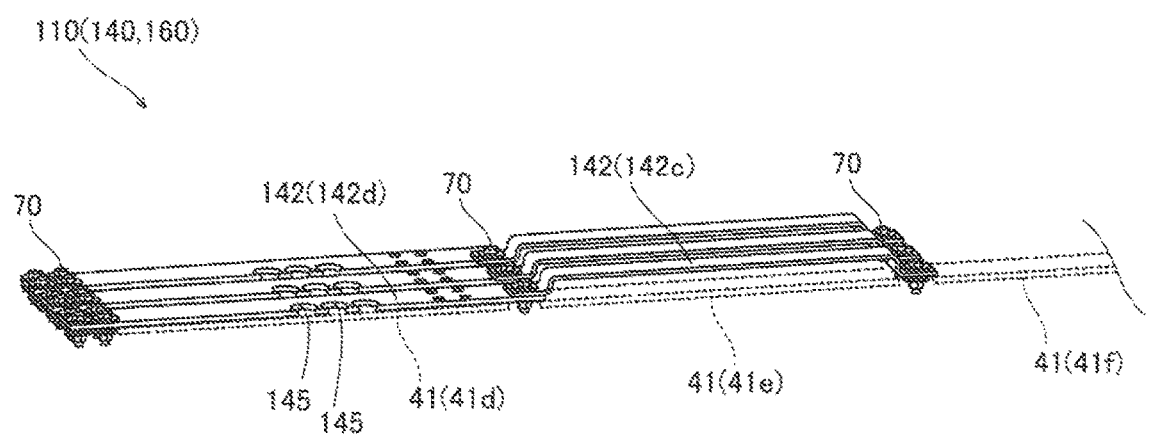
FIG. 7 is a perspective view of an output-side connection member of the uninterruptible power supply according to the second embodiment of the present invention.

As shown in FIG. 7, a second connection member 142 (142c) is provided in parallel to a first connection member 41e of the second uninterruptible power supply module 1b. The second connection member 142c has a substantially U-shape.

A second connection member 142 (142d) is provided in parallel to a first connection member 41d of the first uninterruptible power supply module 1a. According to the second embodiment, the second connection member 142d connected in parallel to the first connection member 41d includes the notches 145 through which bolts 70 (bolts 70 that connect the output-side switches 16 to the first connection member 41d) pass. A plurality of notches 145 is provided in one second connection member 142d so as to correspond to the number of bolts 70. Furthermore, the second connection member 142d has a flat plate shape (rectangular plate shape). That is, the bolts 70 are penetrated (are allowed to escape) due to the notches 145, and hence it is not necessary to bend the second connection member 142d unlike the first embodiment.

(Effects of Second Embodiment)

According to the second embodiment, the following effects can be obtained.

According to the second embodiment, as described above, the second connection members 142 connected in parallel to the first connection members 41 include at least one of the holes 144 and the notches 145 through which the bolts 70 pass. Thus, the bolts 70 are allowed to escape due to the holes 144 or the notches 145, and hence mechanical interference between the bolts 70 and the second connection members 142 can be prevented. Furthermore, the bolts 70 pass through at least one of the holes 144 and the notches 145 such that the second connection members 142 can be disposed so as to overlap the first connection members 41 without being bent. Thus, it is possible to significantly reduce or prevent an increase in the size of the connection members 140.

Modified Examples

The embodiments disclosed this time must be considered as illustrative in all points and not restrictive. The range of the present invention is not shown by the above description of the embodiments but by the scope of claims for patent, and all modifications (modified examples) within the meaning and range equivalent to the scope of claims for patent are further included.

Figure 8:
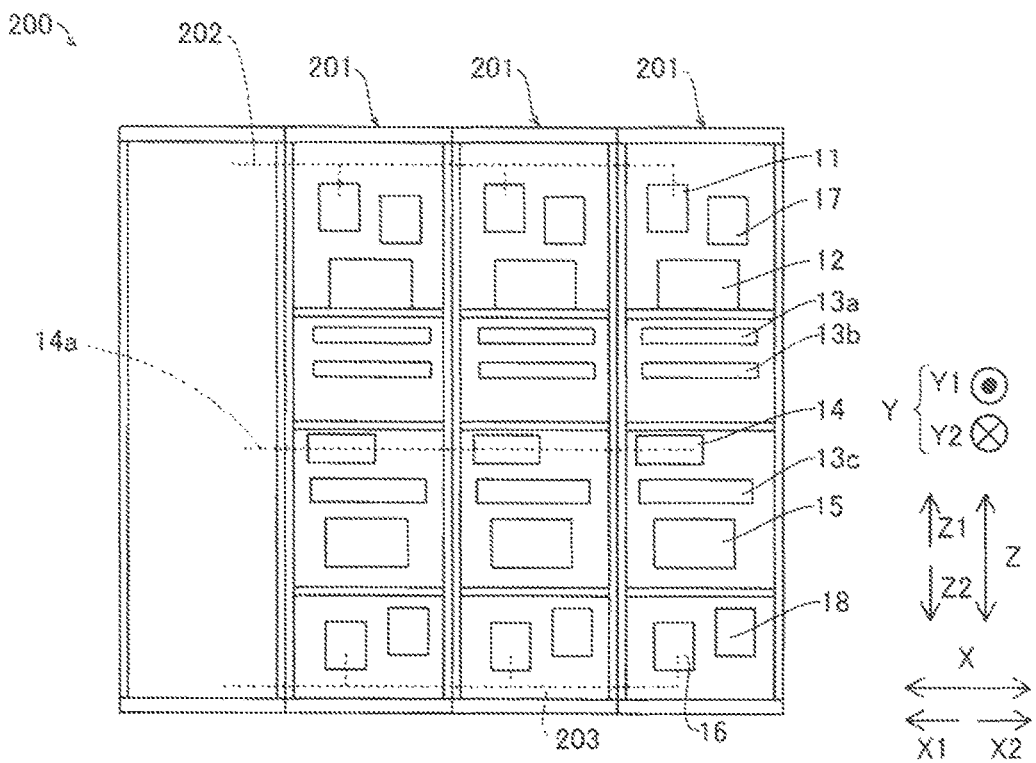
FIG. 8 is a front view schematically showing an uninterruptible power supply according to a first modified example of the first and second embodiments of the present invention.

For example, while the input-side connection members and the output-side connection members are disposed in the upper portions of the uninterruptible power supply modules in the housings in each of the aforementioned first and second embodiments, the present invention is not restricted to this. For example, as in an uninterruptible power supply 200 according to a first modified example shown in FIG. 8, an input-side connection member 202 may be disposed in upper portions of uninterruptible power supply modules 201, and an output-side connection member 203 may be disposed in lower portions of the uninterruptible power supply modules 201. In this case, input-side switches 11, input filters 12, rectifier circuits 13a, chopper circuits 13b, DC reactors 14, inverter circuits 13c, output filters 15, and output-side switches 16 are disposed in this order from the upper side toward the lower side (in an arrow Z2 direction).

Figure 9:
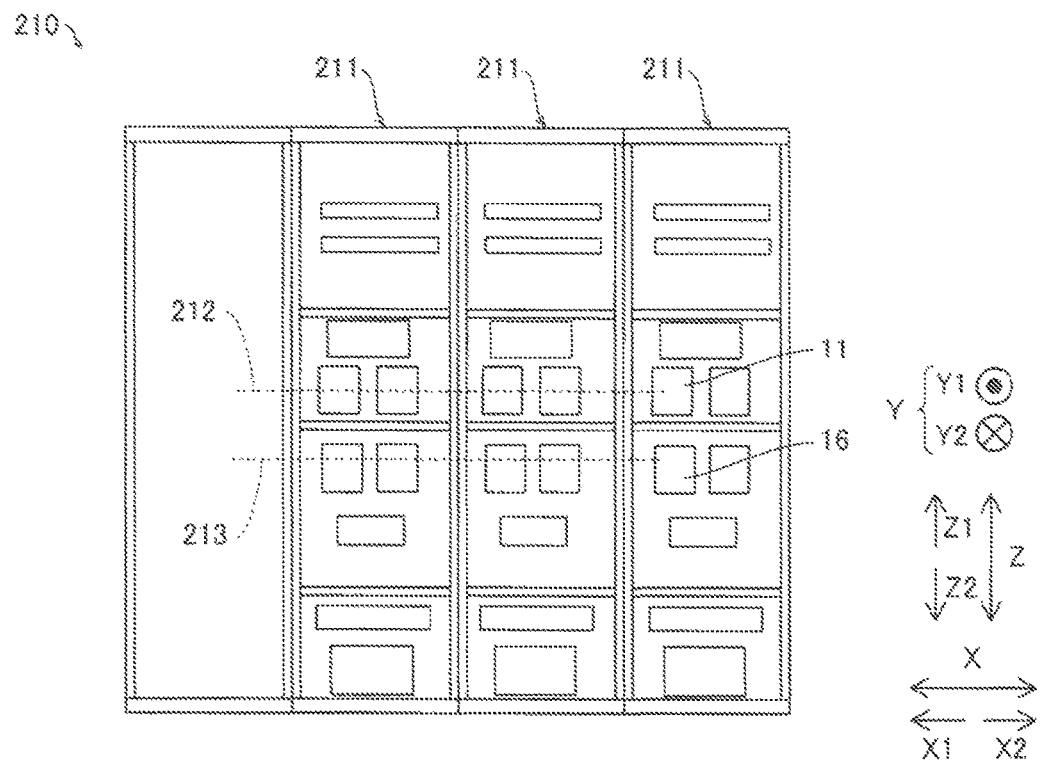
FIG. 9 is a front view schematically showing an uninterruptible power supply according to a second modified example of the first and second embodiments of the present invention.

As in an uninterruptible power supply 210 according to a second modified example shown in FIG. 9, an input-side connection member 212 and an output-side connection member 213 may be disposed between upper portions and lower portions of uninterruptible power supply modules 211 (in the vicinity of middle portions, for example). That is, the input-side connection member 212 and the output-side connection member 213 may be disposed between any of input-side switches 11, input filters 12, power converters 13, DC reactors 14, output filters 15, and output-side switches 16, which the uninterruptible power supply 210 includes. Alternatively, both the input-side connection member and the output-side connection member may be disposed in lower portions of the uninterruptible power supply modules.

While the third uninterruptible power supply module includes only the first connection member (the number of the second connection members is zero), the second uninterruptible power supply module includes one first connection member and one second connection member, and the first uninterruptible power supply module includes one first connection member and two second connection members in the aforementioned first embodiment, the present invention is not restricted to this. According to the present invention, the number of the second connection members is adjusted in accordance with the magnitude of the current that flows through the connection member(s). That is, when the current that flows through the connection member(s) is relatively large, the number of the second connection members is increased, and when the current that flows through the connection member(s) is relatively small, the number of the second connection members is decreased (or is decreased to zero).

While the three uninterruptible power supply modules are provided in the uninterruptible power supply in each of the aforementioned first and second embodiments, the present invention is not restricted to this. For example, two, or four or more uninterruptible power supply modules may be provided in the uninterruptible power supply.

While the second connection members each have a substantially U-shape so as to avoid the bolts in the aforementioned first embodiment, the present invention is not restricted to this. According to the present invention, the second connection members each may have any shape as long as the shape allows the second connection members to avoid the bolts. For example, the second connection members each may have an arcuate shape.

While the second connection member having a substantially U-shape and the second connection member having a flat plate shape and including the holes or the notches are provided (mixed) in the aforementioned second embodiment, the present invention is not restricted to this. For example, only second connection members each having a flat plate shape and including holes or notches may be provided.

While the uninterruptible power supply is of a three-phase three-wire system (that is, three input-side connection members and three output-side connection members are provided for each uninterruptible power supply module) in each of the aforementioned first and second embodiments, the present invention is not restricted to this. For example, the present invention may be applied to an uninterruptible power supply of a three-phase four-wire system. In this case, four input-side connection members and four output-side connection members are provided for each uninterruptible power supply module.

What is claimed is:

1. An uninterruptible power supply comprising:
   a plurality of uninterruptible power supply modules including input-side switches into which AC power is adapted to be input from an AC power source, power converters connected to the input-side switches, and output-side switches that output AC power received from the power converters;
   first connection members that connect the input side-switches of the plurality of uninterruptible power supply modules to each other and that connect the output-side switches of the plurality of uninterruptible power supply modules to each other;
   second connection members connected electrically in parallel to the first connection members and stacked on the first connection members; and
   fastener members that fasten the input-side switches and the output-side switches to the first connection members, respectively,
   wherein the first connection members and the second connection members are disposed at positions accessible from front sides of the plurality of uninterruptible power supply modules, and
   at least one of the second connection members has a bent shape so as to avoid the fastener members.

2. The uninterruptible power supply according to claim 1, wherein the second connection members each have a current capacity proportional to a number of the uninterruptible power supply modules.

3. The uninterruptible power supply according to claim 1, wherein the second connection members in the uninterruptible power supply modules connected closer to the AC power source have larger current capacities.

4. The uninterruptible power supply according to claim 1, wherein the first connection members include input-side connection members that connect the input-side switches to each other, and output-side connection members that connect the output-side switches to each other, and
the input-side connection members and the output-side connection members are disposed in any of upper portions of the uninterruptible power supply modules, lower portions of the uninterruptible power supply modules, and middle portions of the uninterruptible power supply modules.

5. The uninterruptible power supply according to claim 4, wherein the power converters are disposed in the lower portions of the uninterruptible power supply modules,
the input-side switches and the output-side switches are disposed above the power converters, and
the input-side connection members and the output-side connection members are disposed in the upper portions of the uninterruptible power supply modules.

6. The uninterruptible power supply according to claim 1, wherein the plurality of uninterruptible power supply modules includes a first uninterruptible power supply module, a second uninterruptible power supply module, and a third uninterruptible power supply module adapted to be disposed in order from the AC power supply side,
each of connection members respectively connected to input-side switches and output-side switches of the third uninterruptible power supply module includes the first connection member,
each of connection members respectively connected to input-side switches and output-side switches of the second uninterruptible power supply module includes the first connection member and the second connection member, and
each of connection members respectively connected to input-side switches and output-side switches of the first uninterruptible power supply module includes the first connection member and a plurality of the second connection members.

7. An uninterruptible power supply comprising:
a plurality of uninterruptible power supply modules including input-side switches into which AC power is adapted to be input from an AC power source, power converters connected to the input-side switches, and output-side switches that output AC power received from the power converters;
first connection members that connect the input side-switches of the plurality of uninterruptible power supply modules to each other and that connect the output-side switches of the plurality of uninterruptible power supply modules to each other;
second connection members connected electrically in parallel to the first connection members and stacked on the first connection members; and
fastener members that fasten the input-side switches and the output-side switches to the first connection members, respectively,
wherein the first connection members and the second connection members are disposed at positions accessible from front sides of the plurality of uninterruptible power supply modules, and
the second connection members each have a bent shape so as to avoid the fastener members.

8. The uninterruptible power supply according to claim 1, wherein at least one of the second connection members includes at least one of holes and notches through which the fastener members pass.

9. The uninterruptible power supply according to claim 1, wherein the second connection members are connected electrically to the first connection members to increase a capacity of current that flows between the input-side switches of the plurality of uninterruptible power supply modules and a capacity of current that flows between the output-side switches of the plurality of uninterruptible power supply modules.

10. An uninterruptible power supply comprising:
a plurality of uninterruptible power supply modules including input-side switches into which AC power is adapted to be input from an AC power source, power converters connected to the input-side switches, and output-side switches that output AC power received from the power converters;
first connection members that connect the input side-switches of the plurality of uninterruptible power supply modules to each other and that connect the output-side switches of the plurality of uninterruptible power supply modules to each other; and
second connection members connected electrically in parallel to the first connection members and stacked on the first connection members,
wherein the first connection members and the second connection members are disposed at positions accessible from front sides of the plurality of uninterruptible power supply modules,
the plurality of uninterruptible power supply modules includes a first uninterruptible power supply module, a second uninterruptible power supply module, and a third uninterruptible power supply module, adapted to be disposed in order from the AC power supply side,
the first connection members and the second connection members form a first module input-side connection member and a first module output-side connection member, connected electrically to the input-side switch and the output-side switch of the first uninterruptible power supply module, a second module input-side connection member and a second module output-side connection member, connected electrically to the input-side switch and the output-side switch of the second uninterruptible power supply module, and a third module input-side connection member and a third module output-side connection member, connected electrically to the input-side switch and the output-side switch of the third uninterruptible power supply module, and
each of the first module input-side connection member and the first module output-side connection member includes one first connection member and two second connection members, each of the second module input-side connection member and the second module output-side connection member includes one first connection member and one second connection member, and each of the third module input-side connection member and the third module output-side connection member includes one first connection member.

11. The uninterruptible power supply according to claim 10, further comprising a plurality of input-side connection plates including a first input-side connection plate, a second input-side connection plate, and a third input-side connection plate to connect electrically the first connection members and the second connection members to the input-side switches of the plurality of uninterruptible power supply modules,
wherein the first input-side connection plate connects electrically the AC power source and the one first connection member of the first module input-side connection member, the second input-side connection plate connects electrically the one first connection member of the first module input-side connection member and the one first connection member of the second module input-side connection member, and the third input-side connection plate connects electrically the one first connection member of the second module input-side connection member and the one first connection member of the third module input-side connection member, and the one second connection member of the second module input-side connection member connects electrically the second input-side connection plate and the one first connection member of the second module input-side connection member, one of the two second connection members of the first module input-side connection member connects electrically the first input-side connection plate and the one first connection member of the first module input-side connection member, and another of the two second connection members of the first module input-side connection member connects electrically the first input-side connection plate and the second input-side connection plate to be staked on the one of the two second connection members of the first module input-side connection member.

12. The uninterruptible power supply according to claim 11, further comprising a plurality of output-side connection plates including a first output-side connection plate, a second output-side connection plate, and a third output-side connection plate to connect electrically the first connection members and the second connection members to the out-side switches of the plurality of uninterruptible power supply modules, wherein the first output-side connection plate connects electrically a load and the one first connection member of the first module output-side connection member, the second output-side connection plate connects electrically the one first connection member of the first module output-side connection member and the one first connection member of the second module output-side connection member, and the third output-side connection plate connects electrically the one first connection member of the second module output-side connection member and the one first connection member of the third module output-side connection member, and the one second connection member of the second module output-side connection member connects electrically the second output-side connection plate and the third output-side connection plate, one of the two second connection members of the first module output-side connection member connects electrically the first output-side connection plate and the second output-side connection plate, and another of the two second connection members of the first module output-side connection member connects electrically the first output-side connection plate and the second output-side connection plate to be staked on the one of the two second connection members of the first module output-side connection member.

13. The uninterruptible power supply according to claim 1, wherein the at least one of the second members and at least one of the first connection members on which the at least one of the second members is stacked are arranged to form a gap therebetween in which the fastener members are arranged.

* * * * *